March 10, 1959 K. SALNA 2,876,921
ELECTRICAL BUCKET POSITIONER FOR TRACTOR LOADERS
Filed March 5, 1958 3 Sheets-Sheet 1
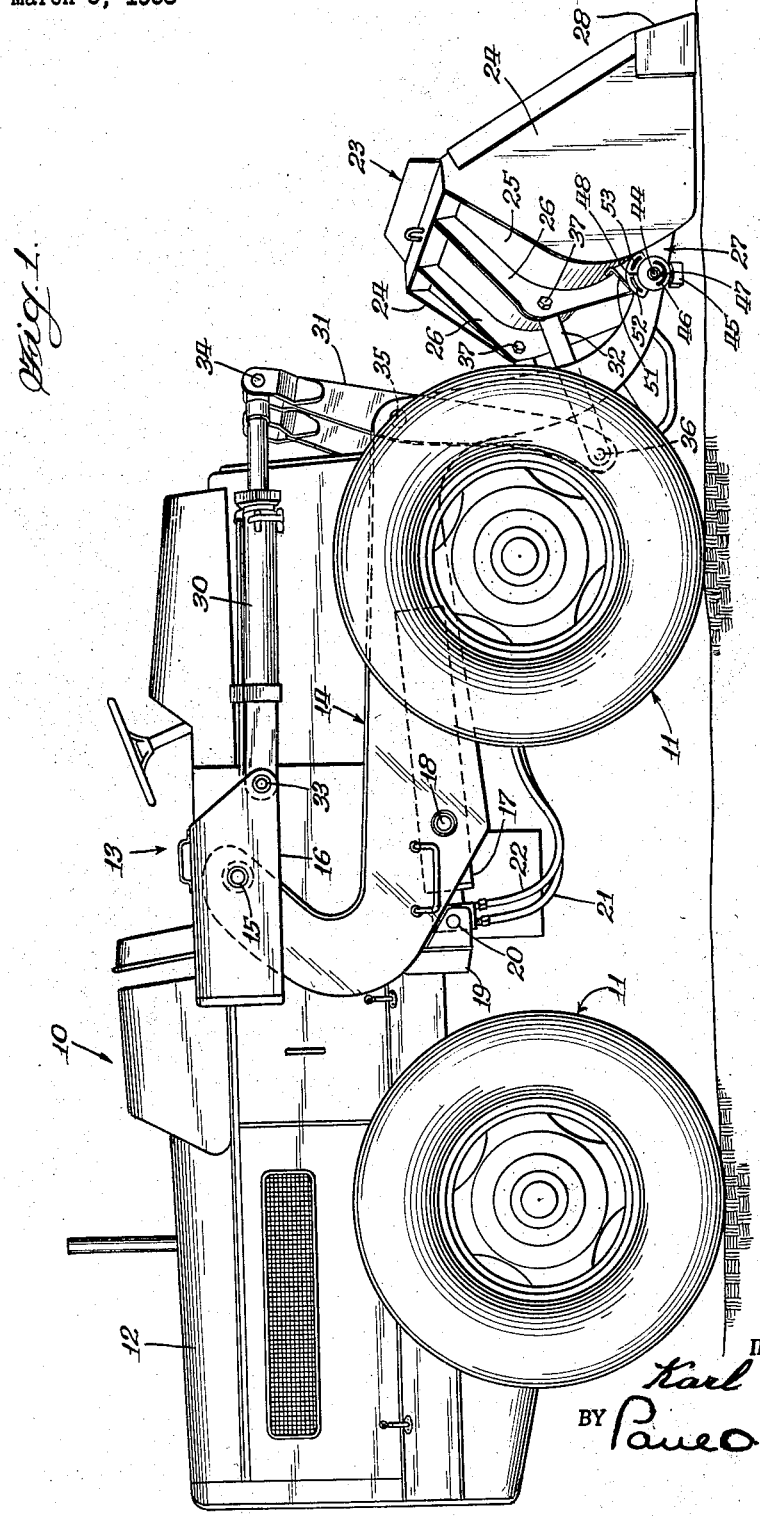
INVENTOR.
Karl Salna
BY Paul O. Pippel March 10, 1959  K. SALNA  2,876,921
ELECTRICAL BUCKET POSITIONER FOR TRACTOR LOADERS
Filed March 5, 1958  3 Sheets-Sheet 2
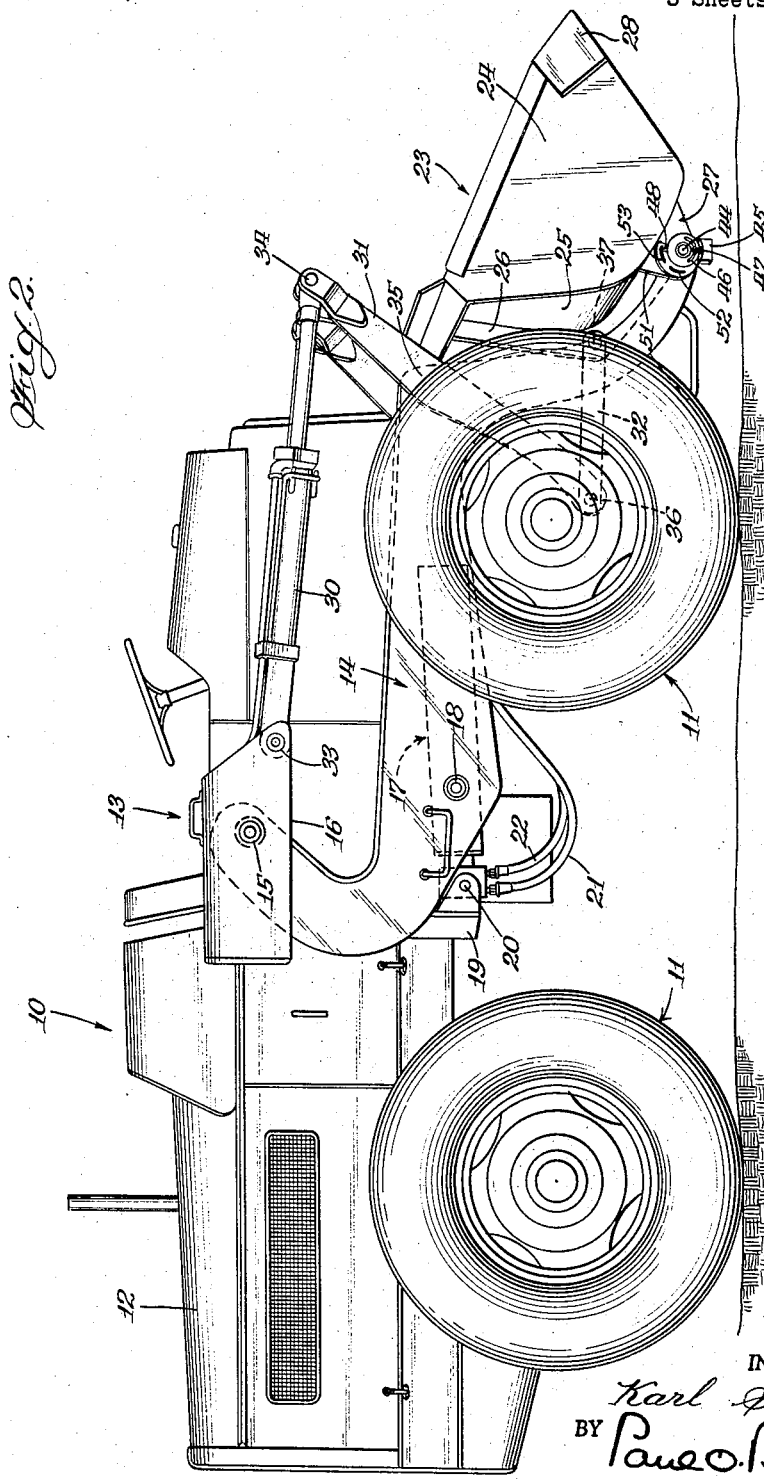
INVENTOR.
Karl Salna
BY Paul O. Pippel
Atty.

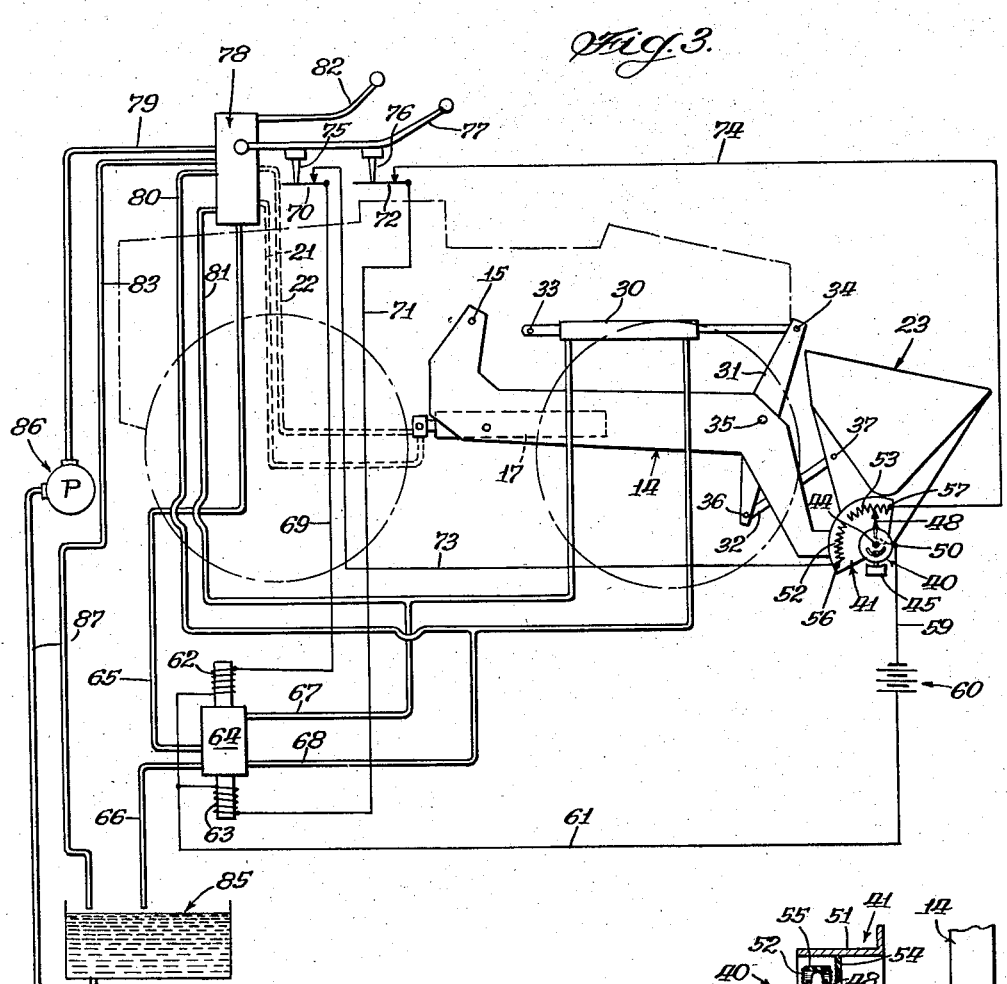
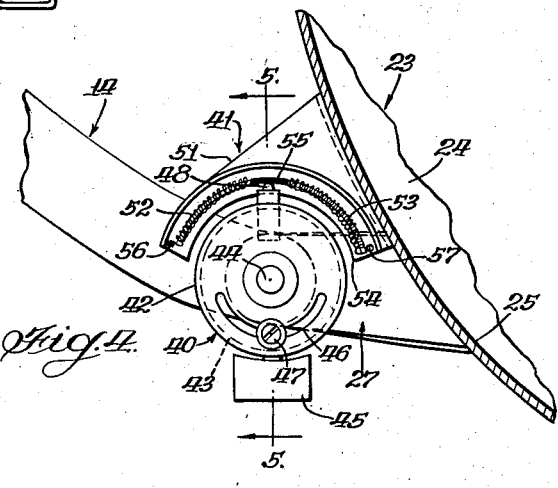
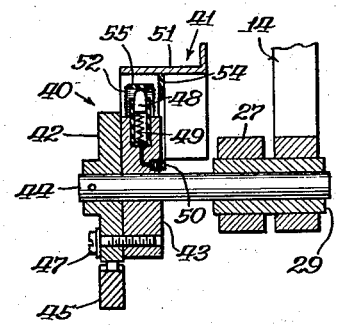

United States Patent Office 2,876,921
Patented Mar. 10, 1959

2,876,921

ELECTRICAL BUCKET POSITIONER FOR TRACTOR LOADERS

Karl Salna, Oak Park, Ill., assignor to The Frank G. Hough Co., a corporation of Illinois Application March 5, 1958, Serial No. 719,334

17 Claims. (Cl. 214—140)

This invention relates generally to tractor loaders, and more specifically to an improved arrangement for automatically controlling the position of the bucket relative to ground level.

It is intended that the present invention be applied to tractor loaders of the front end type which generally comprise a tractor having boom and linkage means pivotally mounted thereon and extending forwardly thereof with a bucket or shovel operatively mounted on the forward end of said boom and linkage means. Hydraulic means are generally provided for raising, lowering and pivoting the bucket. Because of the inherent operating characteristics of these loaders and especially their hydraulic system and because of the distance and position of the operator of the tractor loader relative to the bucket, it is oftentimes difficult to accurately and quickly position the bucket to one of its various necessary operating positions such for example as the horizontal digging position. In the digging function the tractor is moved forwardly to cause the cutting edge of the bucket to cut into the material being worked, the exact angle at which the cutting edge penetrates the material to be worked is important to the operating efficiency of the tractor loader. Further, when the tractor loader is traveling with a loaded bucket on inclined or rough surfaces it is desirable that the bucket be maintained in a position providing minimum spillage of the load from the bucket.

Recognizing the necessary functions and operating characteristics of hydraulically operated front end type tractor loaders, it is the object of the present invention to provide means for automatically indexing the bucket in any one predetermined position.

It is another object of the present invention to provide an electrical controller in a front end type tractor loader which will automatically operate to control the bucket positioning mechanism of the loader to maintain the bucket in any one pivoted position relative to ground level.

It is a further object of the present invention to provide, in a front end type tractor loader having hydraulic means for pivoting the bucket relative to ground level, certain automatically operated electrical means for controlling the hydraulic means of the tractor loader to maintain the bucket in one pivoted position relative to ground level as the bucket is raised and lowered.

It is a further object of the present invention to provide, in a tractor loader of the front end type, a gravity responsive electrical controller for controlling the means for pivoting the bucket thereof.

Other objects and features of the present invention will be apparent upon a perusal of the following specification and drawings of which:

Figure 1 is a side perspective view of a front end tractor loader constructed according to the present invention with the bucket in the dig position at ground level;

Figure 2 is a side view such as shown in Figure 1 with the bucket pivoted rearwardly to a carrying position;

Figure 3 is a diagrammatic view of the control system of the present invention;

Figure 4 is an enlarged partial side elevational view of the forward end of the boom and the lower rearward end of the bucket shown in Figures 1 and 2; and Figure 5 is a cross-sectional view of the structure shown in Figure 4 and taken along the line 5—5 of Figure 4.

The present embodiment is the preferred embodiment but it is understood that changes can be made in the present embodiment by one skilled in the art without departing from the spirit and scope of the present invention.

Generally the present invention comprises a pair of resistors arranged about the pivot axis of the bucket to the boom with a contact arm pivotally mounted about the same pivot axis, with the contact arm weighted so that as the boom is raised and lowered the contact arm will remain substantially in one angular position relative to a vertical line, with electrical circuitry connected to the resistors and the contact arm and including an electrically operated valve operating in a direction and at a speed dependent upon the position of the contact arm relative to the resistors. The electrically operated valve is connected into the hydraulic system for pivoting the bucket relative to the boom so that upon operation of the valve, the hydraulic system is operated to pivot the bucket at certain speeds in certain directions. The invention is further so arranged that the hydraulic system for pivoting the bucket by the operator of the loader may at all times be selectively operated. The specific position of the contact arm relative to the vertical or horizontal and relative to the position of the resistors on the bucket determines the exact position to which the bucket is automatically operated. This relationship between the contact arm and the resistors on the bucket is variable so that the automatically indexed position of the bucket may be selected and varied at will.

For a detailed description of the present invention reference is made to the drawings. The tractor 10 may be of any suitable type known in the art and in the present embodiment comprises a body supported by four wheels 11. The rearward end of the body comprises an engine compartment 12 with the operator's compartment 13 disposed at the forward end thereof. The boom 14 which is formed in duplicate portions disposed on each side of the tractor 10 has a somewhat modified S-shape to provide suitable clearance for the operator in the operator's compartment and to provide for the carrying of the bucket close to the forward end of the tractor 10. One end of the boom 14 is pivotally mounted on the tractor 10 by means of pivotal mounting means 15. The pivotal mounting means 15 extends between the side walls of the tractor and a plate 16 mounted on the tractor 10 and spaced a short distance therefrom, and the boom 14 is disposed between the plate 16 and the side walls of the tractor 10. The other end of the boom 14 extends forwardly of the tractor 10. The boom 14 is raised and lowered by a pair of hydraulic rams 17, one being provided for each portion of the boom 14 on each side of the tractor 10. The cylinder of each hydraulic ram 17 is pivotally connected to the walls of the boom 14 by means of pivotal mounting means 18. The rod of each hydraulic ram 17 is pivotally connected to a bracket 19 by means of pivotal mounting means 20. The hydraulic ram 17 of the present embodiment which is of the double acting type further is of the type wherein hydraulic fluid is delivered to either end of the cylinder through conduits formed within the piston rod of the ram. Hydraulic fluid conduits 21 and 22 are connected to the conduits in the piston rod of the ram 17 for supplying hydraulic fluid thereto. The bracket 19 is mounted on the side of the tractor 10.

The bucket 23 of the present invention may be of any suitable type known in the art wherein the flanges for pivoting the bucket are mounted on the rear surface thereof some distance above the bottom wall of the bucket. The bucket 23 comprises a pair of side walls 24 interconnected by a plate 25 which forms the rear and bottom wall of the bucket 23. The plate 25 of the bucket 23 is provided with two pairs of flanges 26 and 27. The bucket 23 is further provided with a cutting edge 28 which extends transversely across the forward marginal edge of the bottom wall thereof and a short distance upwardly along the side walls thereof. The bucket 23 is pivotally mounted through flanges 27 on the forward end of each portion of the boom 14 by means of a pair of pins 29 one of which may be seen in Figure 5.

To pivot and hold the bucket 23 in any pivoted position relative to the boom, a linkage means or system formed in duplicate portions disposed in each side of the tractor 10 is provided. Each portion of the linkage system comprises a double acting hydraulic ram 30, a lever 31 and a link 32. The head end of the hydraulic ram 30 is pivotally mounted on the tractor 10 by means of pivotal mounting means 33. The rod of the hydraulic ram 30 is pivotally connected to one end of the lever 31 through pivotal mounting means 34. The lever 31 is pivotally mounted intermediate the ends thereof on the boom 14 intermediate the ends thereof through pivotal mounting means 35. The other end of the lever 31 is pivotally connected to one end of the link 32 through pivotal mounting means 36. The other end of the link 32 is pivotally connected to flange 26 on the bucket 23 through pivotal mounting means 37. When the hydraulic rams 30 are extended, the lever 31 and links 32 will cause the bucket to be pivoted rearwardly or in a counter-clockwise direction as viewed in Figures 1 and 2. When the hydraulic rams 30 are retracted, the lever 31 and links 32 will cause the bucket 23 to be pivoted forwardly. The horizontal dig position at ground level shown in Figure 1 is a position wherein the hydraulic rams 30 are partially extended. In the carrying position shown in Figure 2 the hydraulic rams 30 are substantially completely extended and for dumping of the bucket 23 the rams 30 are substantially completely retracted.

Referring next to a detailed description of the control system for the bucket 23, reference is particularly made to Figures 3, 4 and 5. The control system comprises a contact arm assembly 40 and a resistor arrangement 41. The contact arm assembly 40 comprises two circular members 42 and 43 keyed to a shaft 44. One end of the shaft 44 is journalled through the pin 29 rotatively mounting the bucket 23 on the boom 14. Thus the contact arm assembly 40 is freely rotatable about the same axis about which the bucket 23 pivots relative to the boom 14. Member 42 is provided with a substantial weight 45 depending therefrom and an arcuate slot 46. A set screw 47 extends through the slot 46 and is threaded into the circular member 43. The circular member 43 is provided with a radially slidable electrical contact 48 which is biased outwardly of the member 43 by a coiled spring 49. The member 43 is further provided with an electrical terminal post 50 which is connected to the electrical contact 48 through a conductor and the coiled spring 49. The set screw 47 and the arcuate slot 46 in the member 42 permit adjustment of the angle between the electric contact 48 and the weight 45, with the angle defined by the lines extending longitudinally through the electrical contact 48 and through the weight 45 to the axis of the shaft 44. As shown in the drawings the angle between the electrical contact 48 and the weight 45 is set at 180°. With the above described construction of the contact arm assembly 40, the weight 45 will always depend vertically downwardly independent of the position of the bucket 23 or the boom 14.

The resistor assembly 41 comprises a bracket 51 and two resistor elements 52 and 53 mounted on an insulator element 54 carried by the bracket 51. The insulator element 54 is arcuate in shape and the resistors 52 and 53 are mounted thereon and arranged in an end-to-end manner on an arc. As shown in Figures 4 and 5 the resistors 52 and 53 are wire wound about an insulator core 55. The adjacent ends of the resistors 52 and 53 are not in electrical contact but are separated from each other a short distance. The other ends of the resistors 52 and 53 are respectively provided with electrical terminals 56 and 57 for the connection of conductors thereto. The bracket 51 is mounted on the rear wall 25 of the bucket 23 by any suitable means and is so positioned that the arc described by the resistors 52 and 53 is concentric with the circular elements 42 and 43 and with the shaft 44 so that the electrical contact 48 will sweep the resistors 52 and 53 as the contact arm assembly 40 is rotated relative to the resistor assembly 41. Thus it may be seen that if the boom 14 is maintained in one position and the bucket 23 is pivoted relative to the boom 14, the resistors 52 and 53 will sweep the electrical contact 48. If the bucket 23 is held in one position relative to the boom 14, by the linkage means and the boom 14 is raised or lowered about its pivotal connection 15 with the tractor 10, the weight 45 will maintain the contact arm assembly 40 in one position with respect to a vertical line. The movement of the boom and linkage means will cause a pivoting of the bucket 23 relative to ground level, and the resulting relative movement between the bucket 23 and the contact arm assembly 40 will cause the electrical contact 48 to sweep the resistors 52 and 53. In the present embodiment, the contact arm assembly 40 has been adjusted so that the electrical contact 48 is positioned between resistors 52 and 53 when the bottom wall of the bucket 23 is positioned in a substantially horizontal plane.

Terminal 50 is connected through conductor 59 to one side of the battery 60. The other side of the battery 60 is connected through conductor 61 to one side of each of two electrical solenoids 62 and 63. The electrical solenoids 62 and 63 are on opposite sides of a hydraulic fluid valve 64 for operation of the valve 64 in two directions from a neutral position. The valve 64 has four ports to which the four conduits 65, 66, 67 and 68 are connected. The valve 64 which may be of any suitable type known in the art is so constructed that when in the neutral or centered position, conduit 65 is connected to conduit 66 and conduits 67 and 68 are blocked by the valve 64. When solenoid 62 is energized conduit 65 is connected to conduit 67 and conduit 66 is connected to conduit 68. When solenoid 63 is energized conduit 65 is connected to conduit 68 and conduit 66 is connected to conduit 67.

The other side of solenoid 62 is connected through conduit 69 to one side of the switch 70. The other side of solenoid 63 is connected through conductor 71 to the one side of switch 72. The other side of switch 70 is connected through conductor 73 to terminal post 56 of resistor 52. The other side of switch 72 is connected through conductor 74 to terminal post 57 of resistor 53. The switches 70 and 72 are opened by projections 75 and 76 on lever 77. Lever 77 and lever 82 are the operating levers for two sections of hydraulic fluid valve 78. Hydraulic fluid valve 78 may be of any suitable type known in the art. Operation of lever 77 controls the operation of the section of the valve 78 for operating hydraulic rams 30 and lever 82 operates the section of the valve 78 for operation of the hydraulic rams 17. Hydraulic fluid conduit 79 is connected into both sections of the valve 78. Hydraulic fluid conduits 83, 21 and 22 are connected into the section of the valve 78 controlled by lever 82 and hydraulic fluid conduits 80, 81 and 65 are connected into the section of the hydraulic valve 78 controlled by lever 77. Lever 82 is operable to selectively interconnect conduits 79, 83, 21 and 22 for operation of the hydraulic ram 17. When lever 77 is in the normal unoperated position, that position wherein the projections 75 and 76 do not open switches 70 and 72, conduit 79 is connected to conduit 65 and conduits 80 and 81 are blocked against any hydraulic fluid flow therethrough. In any operated position of the lever 77 the projections 75 and 76 will open switches 70 and 72. In the operated positions of lever 77, conduits 79 and 65 are selectively connected to conduits 80 and 81 for operating the hydraulic rams 30. As can be seen in Figure 3, conduit 67 is connected into conduit 81 and conduit 68 is connected into conduit 80, with conduit 80 being connected to the rod end of the cylinders of hydraulic rams 30 and with conduit 81 being connected into the head end of the cylinders of hydraulic rams 30. Conduit 83 is connected between the valve 78 and the reservoir 85. Conduit 66 is connected between the hydraulic valve 64 and reservoir 85. Conduit 79 is connected from valve 78 to the outlet side of the hydraulic fluid pump 86, and conduit 87 is provided between the hydraulic fluid reservoir 85 and the inlet to the hydraulic fluid pump 86.

Various ones of the conduits and conductors shown in Figure 3 are not shown in the other figures in order not to unnecessarily complicate the drawings. These conduits and conductors may take any suitable path on the tractor loader, paths which may be easily ascertained by one skilled in the art. It is of course intended that the valves 64 and 78, the pump 86 and the reservoir 85 be carried in the body of a tractor with the operating levers 77 and 82 for the valve 78 located conveniently to an operator in the operator's compartment 13 of the tractor 10.

Turning next to a description of the operation of the instant invention in order that the construction thereof may be more readily understood, reference is again made to the drawings. Since the section of the valve 78 controlled by lever 82 is independent of the valve 64 and the other section of the valve 78, the operator of the loader may operate lever 82 to cause the hydraulic rams 17 to extend or retract, to raise or lower the boom 14 any desired degree. Whenever lever 77 is operated from the neutral position the electrical circuits for energizing the solenoids 62 and 63 are opened so that no operation of the valve 64 will take place. Under this condition lever 77 may be operated by the operator of the loader to cause extensions or retractions of the hydraulic rams 30 to in turn pivot the bucket 23 relative to the boom 14 any desired amount. When the lever 77 is in the neutral position wherein switches 70 and 72 are closed, and with the bucket 23 in a position such as shown in Figure 1, the contact arm 48 will be positioned between the two resistors 52 and 53. Under these conditions neither solenoid 62 or 63 will be energized and no operations of the hydraulic rams 30 will take place.

Assuming that the bucket 23 is in a position such as shown in Figures 2 and 3 and that the lever 77 is moved to the neutral position to close switches 70 and 72, the following circuit will then be completed: from one side of the battery 60, conductor 59, terminal post 50, contact arm 48, a portion of resistor 53, conductor 74, switch 72, conductor 71, solenoid 63, and conductor 61 to the other side of the battery 60. This will cause energization of solenoid 63 which in turn will operate valve 64 to cause conduit 65 to be connected to conduit 68 with conduit 66 being connected to conduit 67. The following circuit for hydraulic fluid under pressure will then be completed; from the outlet of pump 86, conduit 79, valve 78, conduit 65, valve 64, conduit 68, conduit 80, to the rod end of the hydraulic rams 30. Low pressure hydraulic fluid will be vented over the following path: from the head end of hydraulic rams 30, conduit 81, conduit 67, valve 64, conduit 66 to the reservoir 85. This hydraulic fluid flow will cause a retraction of the hydraulic rams 30 pivoting the levers 31 counterclockwise as viewed in the drawings, causing links 32 to pivot the bucket 23 clockwise as viewed in the drawings. As the bucket 23 is pivoted clockwise it will rotate the resistor assembly 41 about the axis of the pin 44 in a clockwise direction as viewed in the drawings. When the resistor assembly 41 is moved until the contact arm 48 reaches the area between the two resistors 52 and 53, the previously described circuit will be opened, and solenoid 63 will restore causing hydraulic valve 64 to assume the neutral position wherein conduits 67 and 68 are blocked against any hydraulic fluid flow therethrough and conduit 65 is connected to conduit 66.

If the bucket 23 has been tilted clockwise to a dump position by operation of the lever 77, and if the lever 77 is then returned to the neutral position so that switches 70 and 72 are closed, it may be seen that the resistor assembly 41 will have been moved so that the contact arm 48 will contact resistor 52. The following electric circuit will then be completed; from one side of the battery 60, conductor 59, terminal post 50, contact arm 48, resistor 52, terminal 56, conductor 73, switch 70, conductor 69, solenoid 62, conductor 61 to the other side of the battery 60. This electrical circuit will cause an energization of the solenoid 62 which will in turn operate valve 64 to interconnect hydraulic fluid conduits 65 and 67 and to interconnect hydraulic fluid conduits 66 and 68. The following hydraulic fluid circuit will then be completed; from the outlet side of the pump 86, conduit 79, valve 78, conduit 65, valve 64, conduit 67, conduit 81 to the head end of the cylinders of the hydraulic rams 30, and from the rod end of the cylinders of the hydraulic rams 30 hydraulic fluid will flow through conduit 80, conduit 68, valve 64, conduit 66 to the reservoir 85. The hydraulic rams 30 will thus be extended to pivot levers 31 in a clockwise direction as viewed in the drawings to cause links 32 to pivot the bucket 23 in a counterclockwise direction as viewed in the drawings. When the bucket 23 is pivoted sufficiently so that the contact arm reaches the area between the two resistors 52 and 53, the previously described electrical circuit will be opened and the valve 64 will restore to block conduits 67 and 68 thereby holding the bucket 23 in the horizontal dig position. Thus it may be seen that when the contact arm 48 contacts the resistor 53 the bucket 23 is tipped forwardly and when the contact arm 48 contacts resistor 52 the bucket is tipped rearwardly toward the horizontal position.

Due to the arrangement of the linkage system, there is a tendency to cause a tipping or pivoting of the bucket as the boom 14 is raised and lowered. As the boom 14 is raised and lowered, the contact arm 48 will remain in the vertical position due to the weight 45. Any pivoting of the bucket 23 by the linkage means will cause either of the resistors 52 or 53 to contact the contact arm 48 and cause a subsequent energization of the associated solenoids 62 or 63 to in turn cause operation of the hydraulic rams 30 to compensate for the tipping of the bucket to maintain the bucket substantially in a horizontal dig position as the boom is raised and lowered thereby compensating for any tipping of the bucket caused by the geometry of the linkage means.

Although the automatic indexing of the bucket has been described as constantly returning the bucket to the horizontal dig position, by an adjustment of the weight-carrying member 42 relative to the member 43 any one of many other indexed positions may be selected. For example considering Figure 3 it may be seen that if the set screw 47 is loosened and if the member 43 is rotated counterclockwise as viewed in Figure 3 until the contact arm 48 is between the two resistors 52 and 53, and if the set screw 47 is then secured, the bucket 23 will always be automatically pivoted to the carrying position shown therein when the switches 70 and 72 are closed. The selected automatically indexed position is always one certain position relative to the vertical, since the weight 45 will always determine the position relative to the vertical at which the contact arm 48 is disposed.

It should be noted that the speed at which the bucket will be automatically pivoted toward the indexed position is directly proportional to the amount by which the bucket is removed from the indexed position. In the previously described circuits for energization of the solenoids 62 and 63 it was pointed out that the current passes from the contact arm 48 through resistors 52 or 53 to the corresponding terminal post 56 or 57. It may be seen that when the contact arm 48 is close to one of the terminal posts, such as in Figure 3, a minimum of the resistance of resistors 52 or 53 is in series with the solenoid 62 or 63. Therefore a larger voltage drop will be applied across the solenoid 62 or 63 and the action of the solenoids and the valve 64 will be comparatively rapid relative to the speed of operation of the solenoids and the valve 64 when the contact arm 48 is close to the area between the two resistors 52 and 53, when a maximum of the resistance of the resistors is in series in the circuit.

The size of the resistors 52 and 53, the voltage of the battery 60, the number of turns in the coils of the solenoids 62 and 63, and the volume characteristics of the valve 64 are so selected that an optimum range of speeds for pivoting the bucket 23 is provided with the contact arm 48 moving over the range of the resistors 52 and 53.

Having described the invention what is considered new and desired to be protected by Letters Patent is:

1. In a tractor loader, a boom operatively carried on said tractor and extending forwardly thereof, a bucket pivotally mounted on said boom, means for pivoting said bucket relative to said boom, and gravity controlled means operating responsive to any pivoted position of said bucket relative to ground level other than one selected position for operating said first mentioned means to pivot said bucket to said one selected position.

2. In a tractor loader, a boom operatively carried on said tractor and extending forwardly thereof, a bucket pivotally mounted on said boom, linkage means connected between said tractor and said bucket for pivoting said bucket relative to said boom, and gravity controlled means operating responsive to any pivoted position of said bucket relative to ground level other than one selected position for operating said linkage means to pivot said bucket to said one selected position.

3. In a tractor loader, a boom operatively carried on said tractor and extending forwardly thereof, a bucket pivotally mounted on the forward end of said boom, linkage means connected between said tractor and said bucket for pivoting said bucket relative to said boom, and gravity controlled means operating responsive to any pivoted position of said bucket relative to ground level other than one selected position for operating said linkage means to pivot said bucket to said one selected position at a speed directly proportional to the difference between said one selected position and any other pivoted position of said bucket.

4. In a tractor loader, a boom pivotally mounted on said tractor and extending forwardly thereof, a bucket pivotally mounted on said boom, means for pivoting said boom to raise and lower said bucket, means for pivoting said bucket relative to said boom, a pair of electrical resistors mounted on said bucket and positioned on an arc of a circle having its center at the axis of pivoting of said bucket on said boom, a weighted electrical contact arm carried by said boom and freely rotatively mounted about the axis of pivoting of said bucket on said boom, said contact arm positioned to cooperate with said pair of resistors so that said resistors will sweep said contact arm as said bucket is pivoted relative to ground level, and means connected to said resistor means and said contact arm for controlling the operation of said means for pivoting said bucket relative to said boom to position said bucket in one selected pivoted position relative to ground level from any other pivoted position of said bucket.

5. In a tractor loader as claimed in claim 3 wherein said last mentioned means connected to said resistor means and said contact arm for controlling the operation of said means for pivoting said bucket relative to said boom is formed to include means for controlling the operation of said means for pivoting said bucket relative to said boom at speeds proportional to the difference between said one selected position and any other pivoted position of said bucket.

6. In a tractor loader, a boom pivotally mounted on said tractor and extending forwardly thereof, a bucket pivotally mounted on said boom, means for pivoting said boom to raise and lower said bucket, means for pivoting said bucket relative to said boom comprising a double acting hydraulic ram, a hydraulic valve connected to said hydraulic ram and operable in two directions to extend and retract said hydraulic ram, a pair of solenoids mounted on said hydraulic valve and connected thereto so that each of said solenoids operates said hydraulic valve in one of said two directions, a pair of electrical resistors mounted on said bucket and positioned on an arc of a circle having its center at the axis of pivoting of said bucket on said boom, a weighted electrical contact arm carried by said boom and freely rotatively mounted about the axis of pivoting of said bucket on said boom, said contact arm positioned to cooperate with said pair of resistors so that said resistors will sweep said contact arm as said bucket is pivoted relative to ground level, each of said resistors electrically connected to one of said solenoids, electrical circuit means connected to said contact arm and to said solenoids for operating the solenoid connected to the resistor contacted by said contact arm, said pair of resistors being spaced apart so that when said contact arm is positioned between said resistors both of said solenoids are unoperated, said hydraulic valve connected to said hydraulic ram so that when one of said solenoids is operated said hydraulic ram is operated to pivot said bucket and said pair of electrical resistors in a direction whereby said contact arm approaches the end of said resistor adjacent to the other of said resistors.

7. In a tractor loader, a boom pivotally mounted on said tractor and extending forwardly thereof, a bucket pivotally mounted on said boom, means for pivoting said boom to raise and lower said bucket, means for pivoting said bucket relative to said boom comprising a double-acting hydraulic ram, a source of hydraulic fluid pressure, a hydraulic valve connected to said source of hydraulic fluid pressure and to said hydraulic ram and operable to selectively extend and retract said hydraulic ram, a second hydraulic valve connected to said hydraulic ram in parallel of said first hydraulic valve and operable in two directions to extend and retract said hydraulic ram, said first hydraulic valve connected to said second hydraulic valve and formed so that in a neutral unoperated position thereof hydraulic fluid under pressure is delivered to said second hydraulic valve, gravity controlled means associated with said second hydraulic valve and operating responsive to any pivoted position of said bucket relative to ground level other than one selected position when said first hydraulic valve is in the neutral unoperated position for operating said second hydraulic valve to operate said hydraulic ram to pivot said bucket to said one selected position.

8. In a tractor loader, a boom pivotally mounted on said tractor and extending forwardly thereof, a bucket pivotally mounted on the forward end of said boom, linkage means connected between said tractor and said bucket for pivoting said bucket relative to said boom, said linkage means including a double-acting hydraulic ram, hydraulic pump and valve means for selectively delivering high pressure hydraulic fluid to said hydraulic ram to extend and retract said hydraulic ram to operate said linkage means to pivot said bucket, second valve means connected to said first valve means so that hydraulic fluid under pressure is delivered to said second valve means when said first valve means is in the neutral unoperated position, a pair of solenoids operatively connected to said second valve means, said second valve means connected to said hydraulic ram so that said hydraulic ram is extended when one of said solenoids is operated and retracted when the other one of said solenoids is operated, gravity controlled electrical circuit means carried on the forward end of said boom and on said bucket and connected to said solenoids and operating responsive to the pivoting of said bucket for operating said solenoids to operate said second valve means to automatically pivot said bucket to one selected pivoted position relative to ground level from any other pivoted position of said bucket.

9. In a tractor loader as claimed in claim 8 wherein means is included in said gravity controlled electrical circuit means for operating said solenoids to operate said second means to automatically pivot said bucket to said one selected position relative to ground level at a speed directly proportional to the difference between said one selected pivoted position and any other pivoted position of said bucket.

10. In a tractor loader as claimed in claim 8 wherein said gravity controlled electrical circuit means carried on the forward end of said boom and on said bucket comprises a pair of electrical resistors mounted on said bucket and positioned on an arc of a circle having its center at the axis of pivoting of said bucket on said boom, a weighted electrical contact arm carried by said boom and freely rotatively carried about the axis of pivoting of said bucket on said boom, said contact arm positioned to cooperate with said pair of resistors so that said resistors will sweep said contact arm as the bucket is pivoted relative to ground level, each of said solenoid connected to one of said resistors, and said contact arm connected in said circuit means so that said one of said solenoids is operated when said contact arm sweeps the electrical resistor connected thereto and so that the other of said solenoids is operated when said contact arm sweeps the other electrical resistor.

11. In a tractor loader as claimed in claim 10 wherein said contact arm is weighted so that said contact arm remains in one angular position relative to a vertical line as said boom is raised and lowered, and wherein the angularity of said contact arm relative to a vertical line is adjustable.

12. In a tractor loader having a boom operatively carried on said tractor and extending forwardly thereof, having a bucket pivotally mounted on said boom, the improvement of means for pivoting said bucket relative to said boom, and gravity controlled means operating responsive to any pivoted position of said bucket relative to ground level other than said one selected position for operating said first mentioned means to pivot said bucket to said one selected position.

13. In a tractor loader having a boom operatively carried on said tractor and extending forwardly thereof, having a bucket pivotally mounted on said boom, the improvement of linkage means connected between said tractor and said bucket for pivoting said bucket relative to said boom, and gravity controlled means operating responsive to any pivoted position of said bucket relative to ground level other than one selected position for operating said linkage means to pivot said bucket to said one selected position.

14. In a tractor loader having a boom operatively carried on said tractor and extending forwardly thereof, having a bucket pivotally mounted on the forward end of said boom, the improvement of linkage means connected between said tractor and said bucket for pivoting said bucket relative to said boom, and gravity controlled means operating responsive to any pivoted position of said bucket relative to ground level other than one selected position for operating said linkage means to pivot said bucket to said one selected position at a speed directly proportional to the difference between one selected position and any other pivoted position of said bucket.

15. In a tractor loader having a boom pivotally mounted on said tractor and extending forwardly thereof, having a bucket pivotally mounted on said boom, having means for pivoting said boom to raise and lower said bucket, and having means for pivoting said bucket relative to said boom, the improvement of a pair of electrical resistors mounted on said bucket and positioned on an arc of a circle having its center at the axis of pivoting of said bucket on said boom, a weighted electrical contact arm carried by said boom and freely rotatively carried about the axis of pivoting of said bucket on said boom, said contact arm positioned to cooperate with said pair of resistors so that said resistors sweep said contact arm as said bucket is pivoted relative to ground level, and means connected to said resistor means and said contact arm for controlling the operation of said means for pivoting said bucket relative to said boom to position said bucket in one selected position relative to ground level from any other pivoted position of said bucket.

16. In a tractor loader as claimed in claim 15, wherein said last mentioned means connected to said resistor means and said contact arm for controlling the operation of said means for pivoting said bucket relative to said boom includes means for controlling the operation of said means for pivoting said bucket relative to said boom at speeds proportional to the difference between said one selected position and any other pivoted position of said bucket.

17. In a tractor loader having a boom pivotally mounted on said tractor and extending forwardly thereof, having a bucket pivotally mounted on said boom, having means for pivoting said boom to raise and lower said bucket, having means for pivoting said bucket relative to said boom comprising a double acting hydraulic ram and having a hydraulic valve connected to a source of hydraulic fluid pressure and connected to said double acting hydraulic ram for selectively extending and retracting said hydraulic ram, the improvement of a second hydraulic valve connected to said hydraulic ram in parallel with said first hydraulic valve and operable in two directions to extend and retract said hydraulic ram, a pair of solenoids mounted on said second hydraulic valve and connected thereto so that each of said solenoids operates said hydraulic valve in one of said two directions, a pair of electrical resistors mounted on said bucket and positioned on an arc of a circle having its center at the axis of pivoting of said bucket on said boom, a weighted electrical contact arm carried by said boom and freely rotatively mounted about the axis of pivoting of said bucket on said boom, said contact arm positioned to cooperate with said pair of resistors so that said resistors will sweep the contact arm as said bucket is pivoted relative to ground level, each of said resistors electrically connected to one of said solenoids, electrical circuit means connected to said contact arm and said solenoids for operating the solenoid connected to the resistor contacted by said contact arm, said pair of resistors being spaced apart so that when said contact arm is positioned between said resistors both of said solenoids are unoperated, said second hydraulic valve connected to said hydraulic ram so that when one of said solenoids is operated said hydraulic ram is operated to pivot said bucket and said pair of electrical resistors in a direction whereby said contact arm approaches the end of said resistor adjacent the other of said resistors.

No references cited.